(12) United States Patent
Chouinard

(10) Patent No.: US 10,295,087 B2
(45) Date of Patent: May 21, 2019

(54) MULTI-CONNECTION TRUSS PICK

(71) Applicant: Entertainment Structural Products, Inc., Essington, PA (US)

(72) Inventor: Michael P. A. Chouinard, Swarthmore, PA (US)

( * ) Notice: Subject to any disclaimer, the term of this patent is extended or adjusted under 35 U.S.C. 154(b) by 14 days.

(21) Appl. No.: 15/274,674

(22) Filed: Sep. 23, 2016

(65) Prior Publication Data

US 2017/0009910 A1   Jan. 12, 2017

Related U.S. Application Data

(63) Continuation of application No. 14/626,877, filed on Feb. 19, 2015.

(60) Provisional application No. 61/942,022, filed on Feb. 19, 2014.

(51) Int. Cl.

| | |
|---|---|
| *F16L 3/237* | (2006.01) |
| *E04C 3/04* | (2006.01) |
| *A63J 1/00* | (2006.01) |
| *F16B 45/06* | (2006.01) |
| *F16L 3/10* | (2006.01) |
| *F16L 3/223* | (2006.01) |
| *H02G 3/32* | (2006.01) |
| *E04C 3/02* | (2006.01) |
| *F16B 7/04* | (2006.01) |

(52) U.S. Cl.
CPC .............. *F16L 3/237* (2013.01); *A63J 1/00* (2013.01); *E04C 3/04* (2013.01); *F16B 45/06* (2013.01); *F16L 3/1091* (2013.01); *F16L 3/2235* (2013.01); *E04C 2003/026* (2013.01); *F16B 7/0433* (2013.01); *H02G 3/32* (2013.01)

(58) Field of Classification Search
CPC ........... F16L 3/237; F16L 3/1016; F16L 3/14; F16L 3/11; F16L 3/133; F16L 3/1091; F16L 3/2235; A63J 1/00; E04C 3/04; E04C 2003/026; F16B 45/06; F16B 7/0433; H02G 3/32
USPC .............. 248/68.1, 58–74.5, 317–344, 74.1; 294/82.11; 52/506.08, 634–638, 647, 52/677, 678; 403/361
See application file for complete search history.

(56) References Cited

U.S. PATENT DOCUMENTS

| | | | |
|---|---|---|---|
| 247,361 A * | 9/1881 | Kane | F16L 3/14 248/59 |
| 429,357 A * | 6/1890 | McBee | F16L 3/2235 24/135 R |
| 507,743 A | 10/1893 | McTaggart | |
| 831,245 A * | 9/1906 | Share | F16L 3/2235 248/68.1 |
| 844,036 A | 2/1907 | McMurtrie | |
| 868,694 A | 10/1907 | Parks | |

(Continued)

OTHER PUBLICATIONS

The Light Source Inc.; 12 inch Mega Truss Pick, 1 ton; Nov. 20, 2005; https://www.thelightsource.com/products/12-inch-mega-truss-pick-1-ton-34 (Year: 2005).*

(Continued)

*Primary Examiner* — Ingrid M Weinhold
(74) *Attorney, Agent, or Firm* — Olson & Cepuritis, Ltd.; William P. Oberhardt; Anita M. Cepuritis

(57) ABSTRACT

A truss pick is provided for hanging tubular space frame truss. The truss picks of the present invention allow multiple methods of suspending truss from permanent structural objects.

15 Claims, 6 Drawing Sheets

(56) References Cited

U.S. PATENT DOCUMENTS

| | | | | |
|---|---|---|---|---|
| 1,939,538 A * | 12/1933 | Buhr | ............ | F16L 3/223 248/58 |
| 2,394,263 A | 2/1946 | Reintjes | | |
| 3,002,780 A * | 10/1961 | Eggeman | ............ | B66C 1/14 24/129 R |
| 3,146,614 A * | 9/1964 | Von Frantzius | ............ | E05B 75/00 70/16 |
| 3,383,459 A * | 5/1968 | Short | ............ | H01B 17/42 174/144 |
| 3,436,047 A | 4/1969 | Foltz | | |
| 3,486,725 A | 12/1969 | Hidassy | | |
| 3,707,109 A * | 12/1972 | Bohanec | ............ | A45C 11/38 224/257 |
| 4,007,808 A * | 2/1977 | Conley | ............ | B63C 5/02 182/142 |
| 4,275,556 A * | 6/1981 | Stone | ............ | F16G 15/00 294/82.11 |
| 4,446,818 A | 5/1984 | Rigterink | | |
| 4,865,374 A * | 9/1989 | Gonda | ............ | B66C 1/36 24/598.4 |
| 4,925,136 A * | 5/1990 | Knott | ............ | F16L 3/133 248/62 |
| 5,199,675 A * | 4/1993 | DeGuchi | ............ | F16B 37/0885 248/59 |
| 5,271,588 A * | 12/1993 | Doyle | ............ | F16L 3/237 248/68.1 |
| 5,613,381 A * | 3/1997 | Savage | ............ | E05B 75/00 70/16 |
| 5,667,328 A * | 9/1997 | Hofle | ............ | F16B 5/04 403/242 |
| 5,704,572 A * | 1/1998 | Vogel | ............ | F16L 3/2235 248/65 |
| 5,941,653 A * | 8/1999 | Cipriani | ............ | B60M 1/20 403/338 |
| 6,021,981 A * | 2/2000 | Leebeeck | ............ | F16L 3/11 248/58 |
| 6,336,260 B1 * | 1/2002 | Mauthner | ............ | F16B 45/02 24/376 |
| 7,073,761 B2 | 7/2006 | Diggle | | |
| 9,038,247 B2 * | 5/2015 | Dodge | ............ | F16G 11/101 24/132 WL |
| 2015/0176726 A1 | 6/2015 | Bacon | | |

OTHER PUBLICATIONS

The Light Source Inc.; 12 inch Mega Truss Pick 1 ton; Nov. 20, 2005; https://www.thelightsource.com/products/12-inch-mega-truss-pick-1-ton-34.

Production Resource Group, LLC; PRG Hoist Pick-Up Bar; www.prg.com/technology/products/rigging/hoist-pick-up-bar; (2pages) (Sep. 2011); USA.

* cited by examiner

MULTI-CONNECTION TRUSS PICK

RELATED APPLICATION INFORMATION

This application is a continuation of then co-pending U.S. application Ser. No. 14/626,877, filed Feb. 19, 2015, now abandoned, which, in turn, claims the benefit of and priority from U.S. provisional application Ser. No. 61/942,022, filed Feb. 19, 2014, all of the disclosures of which are incorporated herein by reference.

BACKGROUND OF THE INVENTION

The present invention relates to the field of hanging truss. There is a need in the construction industry for a truss pick which can be used to hang tubular truss. It would be greatly beneficial to have a truss pick which allows multiple methods of suspending truss.

BRIEF DESCRIPTION OF THE DRAWINGS

The features of the present invention are set forth with particularity in the appended claims. The present invention, both as to its organization and manner of operation, together with further objects and advantages thereof, may be best understood with reference to the following description, taken in connection with the accompanying drawings in which

DETAILED DESCRIPTION OF THE INVENTION

Figure 1A:
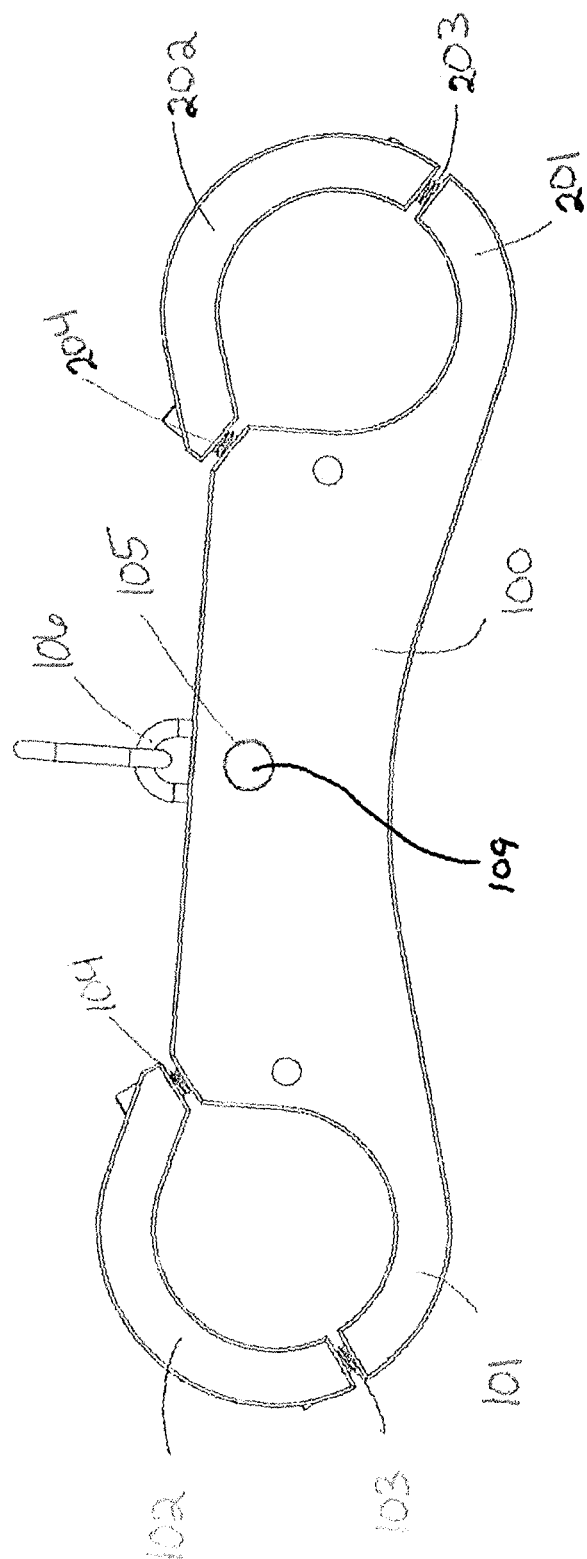
FIG. 1A is a side view of an embodiment of a truss pick.

A truss pick is provided for hanging tubular space frame truss. Tubular truss is used in the entertainment industry in both temporary and permanent rigging systems to hold lights, speakers, and other entertainment equipment. It would be beneficial to have a single truss pick which would allow the hanging of tubular truss from permanent structural objects using multiple methods.

Tubular space frame truss is made of various sized tubular elements. The longitudinal elements are called truss chords or chords. Truss chords can be of various diameters. The truss chords are connected by webbing elements. A truss is a single unit of truss chords along with the webbing that hold them together. Truss has two or more chord elements and can have any number of webbing elements sufficient to hold the truss together. The truss picks of the present invention can be made to hang truss of various diameters and configurations.

A truss pick is used to suspend truss from a secure fixture. To do this, the truss pick must attach to the truss through the truss chords and carry the load from the chords through the body of the truss pick to a largely central location at which the entire load is vertically supported by a tension member (chain, cable, rod, etc.), which is itself secured to a fixture.

The truss picks of the present invention allow the truss to be suspended from a permanent structure via attachment to a chain or via attachment to a cable. To attach a truss pick to a chain, the truss picks of the present invention have a pocket and capture pin hole combination that allows the chain to be secured directly to the truss pick without any intermediate form of attachment. The pocket and capture pin hole combination is a pocket located at the top portion of the truss pick body and a hole that intersects the inside wall of the pocket. To attach a chain (not part of the claimed invention) to the truss pick of the present invention, a chain link is inserted into the pocket, with the pocket, as shown in the embodiments illustrated in FIGS. 1A, 1B, 3A, and 3B, being adapted for receiving the chain link. The chain is then secured to the truss pick by inserting a capture pin through a capture pin hole in the body of the truss pick, thus capturing the chain link directly. When thus attached, the forces are carried in shear by the capture pin to the body. The capture pin can be secured by any means to axially restrain it within the body of the truss pick. This mechanism allows direct connection of the looped tension member to the bodies of the truss picks of the present invention without an intermediate connection, such as a shackle. Alternatively, the pocket can be of such a size to accept any looped termination of the looped tension member, such as a looped cable or a swage eye cable termination.

To attach a truss pick to a non-looped tension member, the truss picks of the present invention have an additional suspension hole substantially perpendicular to the capture pin hole that extends from the bottom surface of the pockets in the top portion of the truss pick through the bottom portion of the body of the truss pick and is largely coaxial with the load being carried. A non-looped tension member, such as a cable or rod, can be passed through this suspension hole. The non-looped tension member can be secured to the truss pick by any termination fitting known in the art, such as a swaged fitting or a nut.

Figure 1B:
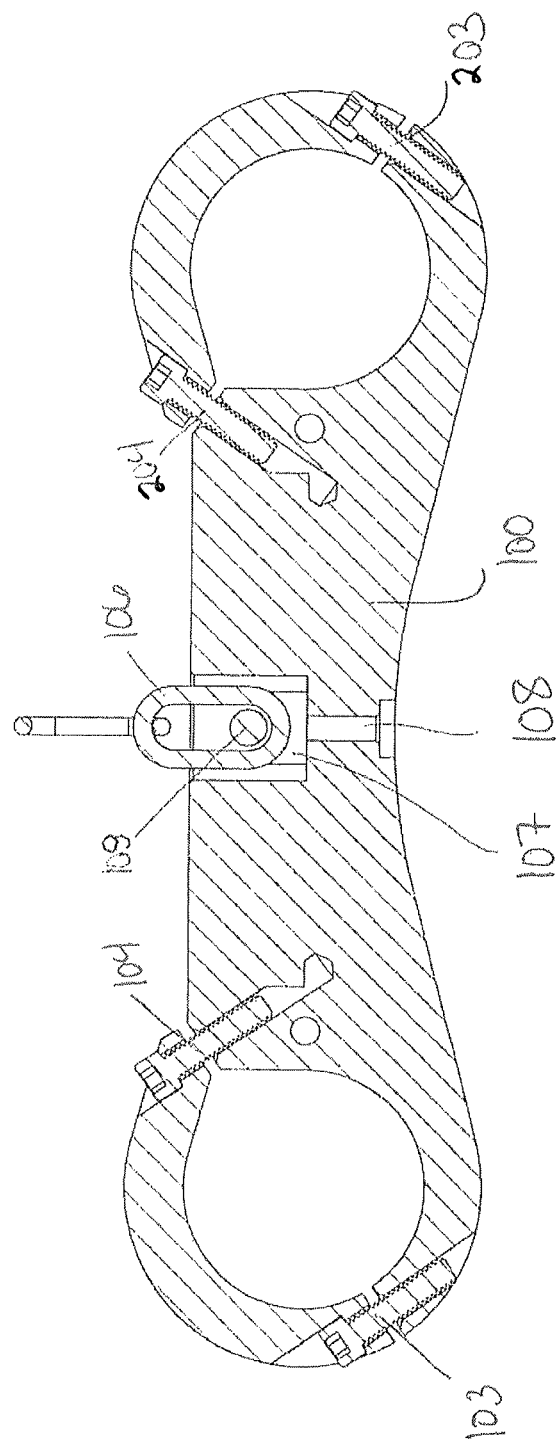
FIG. 1B is a sectioned view of the embodiment of the truss pick in FIG. 1A.

In one aspect of the invention, referring to FIGS. 1A and 1B, the truss pick of the present invention comprises a) a body 100; b) 2 or more saddles (the illustrations show two saddles, namely, a first saddle 101 and a second saddle 201) integral with said body 100 and c) 2 or more clamp members (the illustrations show two clamp members, namely, a first clamp member 102 and a second clamp member 202) attached to said saddles (the referenced illustrations showing the first clamp member 102 being attached to first saddle 101, and to the body 100 adjacent first saddle 101, and the second clamp member 202 being attached to second saddle 201, and to the body 100 adjacent second saddle 201); wherein said body 100 comprises at least one capture pin hole 105 and pocket 107 combination for securing a link of a chain 106 to the truss pick. In other aspects of the invention, said body 100 comprises at least two capture pin hole 105 and pocket 107 combinations, three capture pin hole 105 and pocket 107 combinations, or more than three capture pin hole 105 and pocket 107 combinations.

The truss picks of the present invention attach to space frame truss by clamping onto truss chords. Truss chords sit inside saddles integral with the body of the truss picks of the present invention. First and second clamp members 102 and 202 can attach to said body 100 by any means known in the art. The first and second saddles 101 and 201 and the first and second clamp members 102 and 202 can be of any shape necessary to hold any size chord members of space frame truss.

Figure 2A:
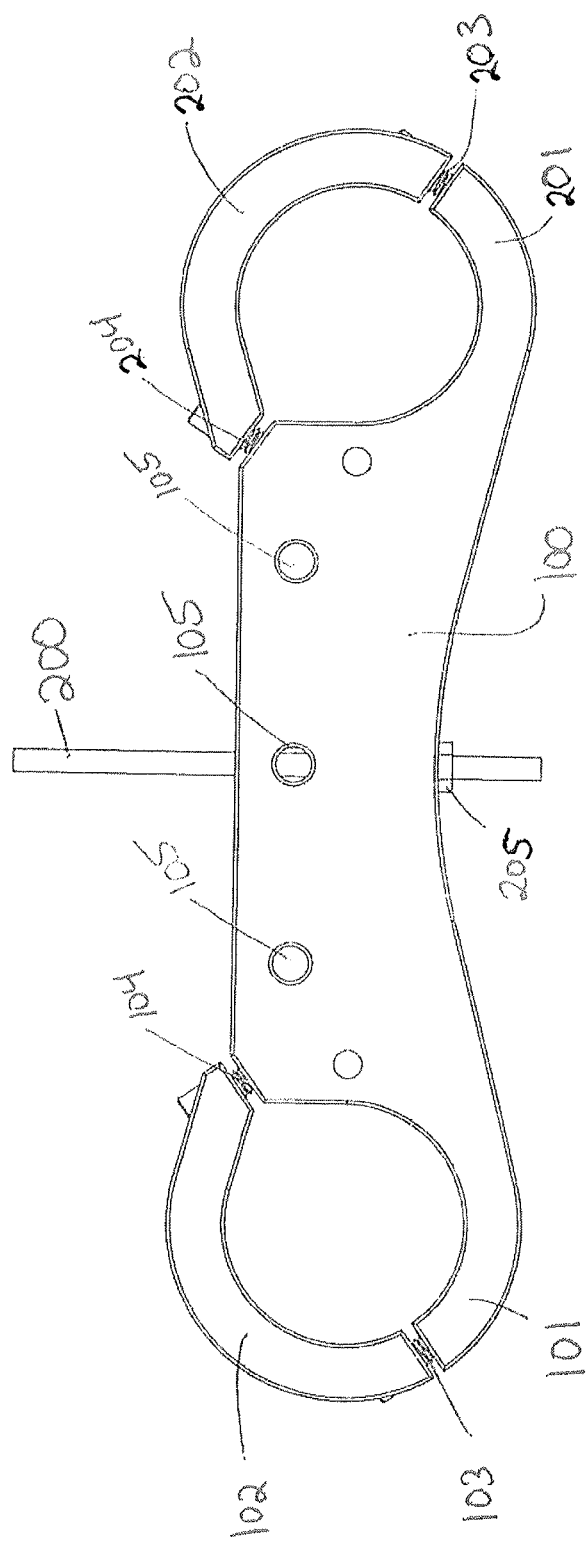
FIG. 2A is a side view of an embodiment of a truss pick.
Figure 2B:
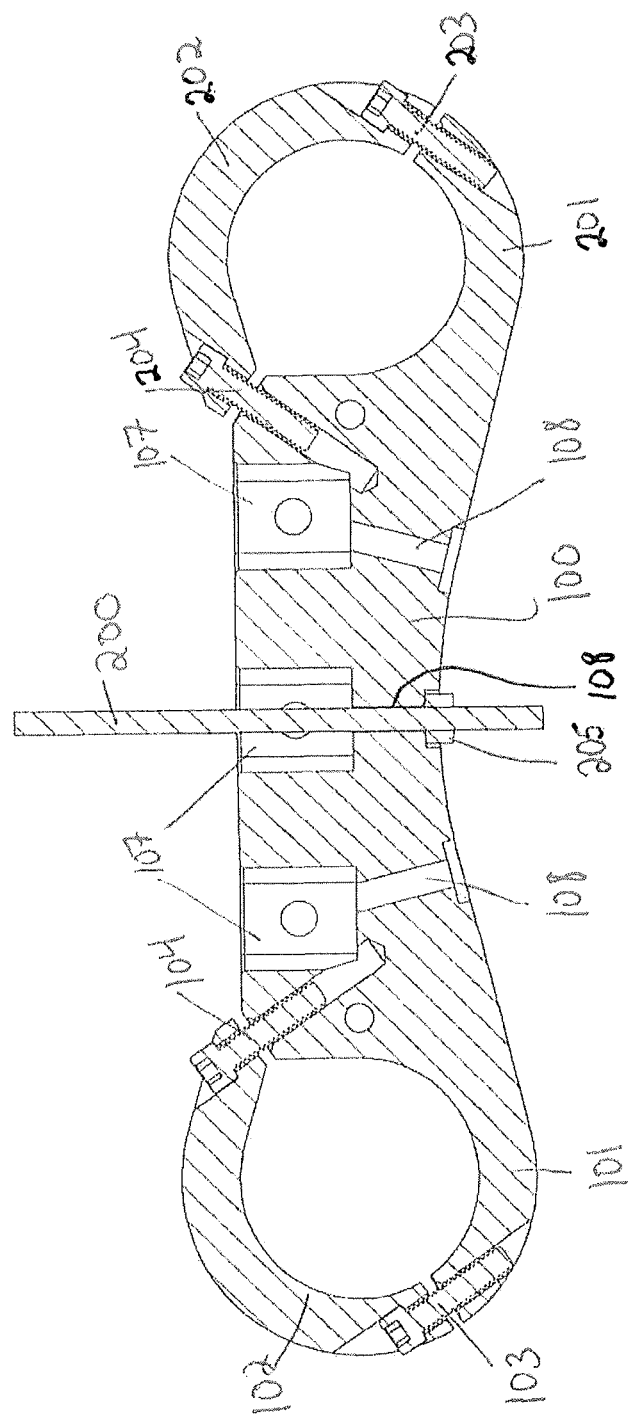
FIG. 2B is a sectioned view of the embodiment of the truss pick in FIG. 2A.
Figure 3A:
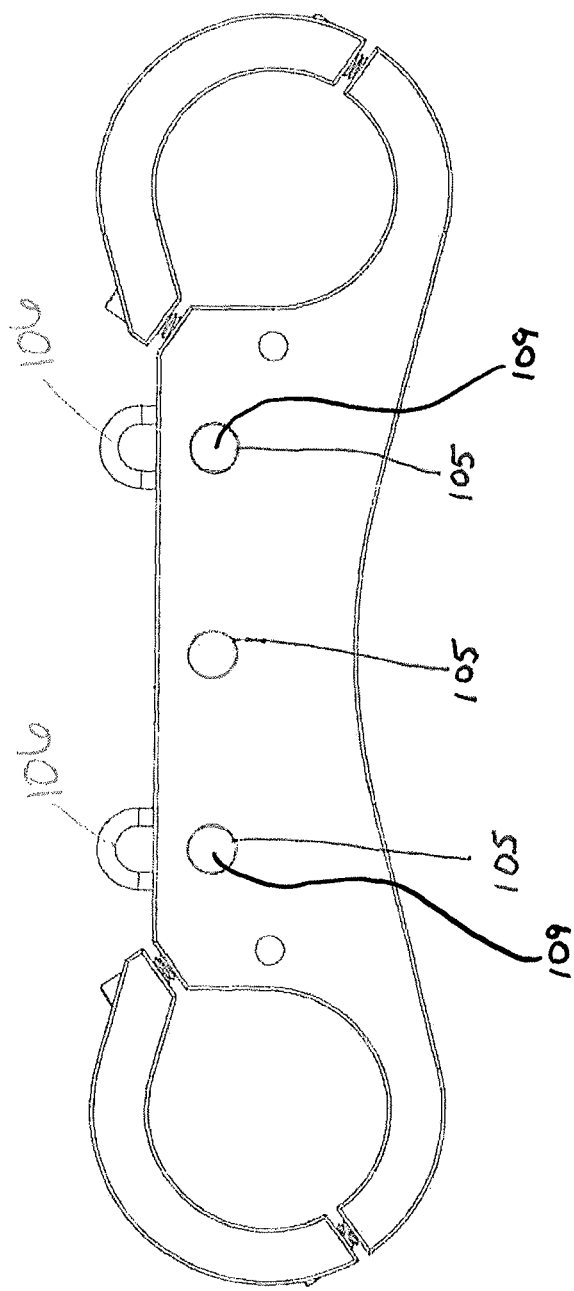
FIG. 3A is a side view of an embodiment of a truss pick.
Figure 3B:
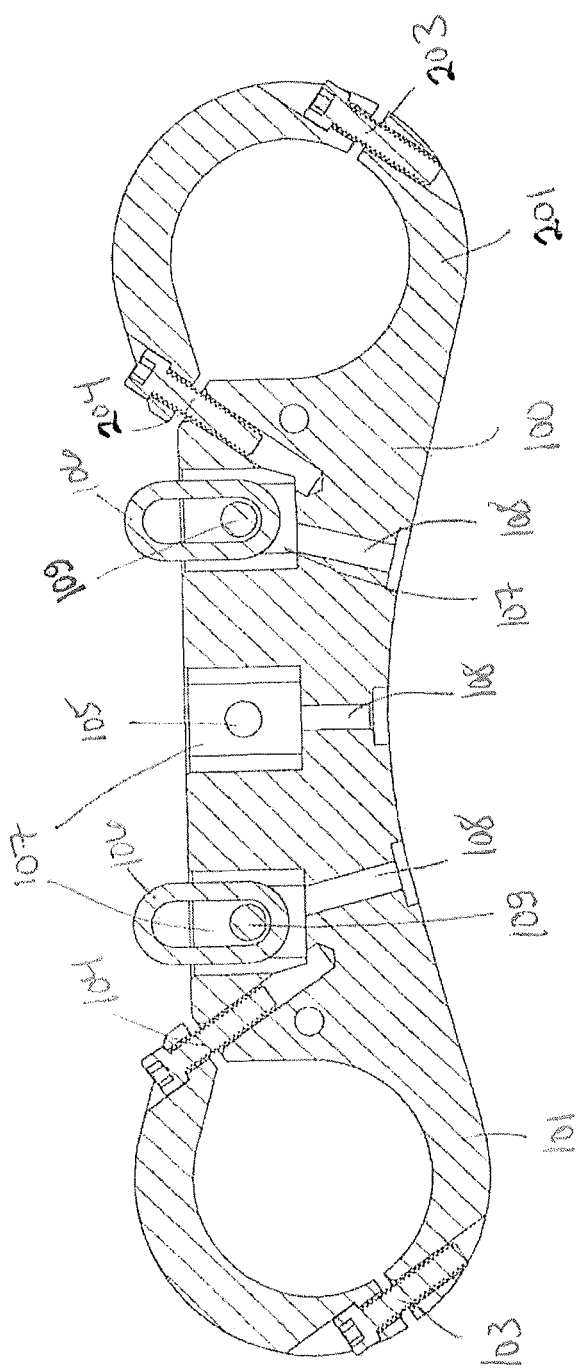
FIG. 3B is a sectioned view of the embodiment of the truss pick in FIG. 3A.

In another aspect of the invention, referring to FIGS. 1B, 2B, and 3B, the truss pick comprises a) a body 100; b) 2 or more saddles 101 and 102 integral with said body 100; and c) 2 or more clamp members 102 and 202 attached to said saddles 101 and 201 (the referenced illustrations showing the first clamp member 102 being attached to the first saddle 101 and to the body 100 adjacent the first saddle 101, and the second clamp member 202 being attached to the second saddle 201 and to the body 100 adjacent the second saddle 201); wherein said body 100 comprises at least one suspension hole 108 through which a non-looped tension member 200 can be passed; said suspension hole 108 being largely coaxial with the direction of the load. In other aspects of the invention, said body 100 comprises at least two suspension holes 108 through which a non-looped tension member 200 can be passed; said body 100 comprises three suspension holes 108 through which a non-looped tension member 200 can be passed; or said body 100 comprises more than three suspension holes 108 through which a non-looped tension member 200 can be passed.

In yet another aspect of the invention (see, particularly, FIGS. 1B, 2B, and 3B), the truss pick comprises a) a body 100; b) 2 or more saddles (101 and 201) integral with said body 100; and c) 2 or more clamp members (102 and 202) attached to said saddles (101 and 201) as previously described); wherein said body 100 comprises at least one capture pin hole 105 and pocket 107 combination for securing a link of a chain 106 to the truss pick; and wherein said body 100 also comprises at least one suspension hole 108 through which a non-looped tension member 200 can be passed, said suspension hole 108 being largely coaxial with the direction of the load.

FIG. 1A is a side view of an embodiment of the truss pick of the present invention. In this figure, the truss pick has a body 100. The body is integral with saddles 101 and 102 (a first saddle 101 and a second saddle 102). The truss pick also has clamp members 102 and 202 (a first clamp member 102 and a second clamp member 202) which are attached to first saddle 101 and second saddle 201 (referring also to FIG. 1B), respectively, by means known in the art, such as bolts 103, 203 (the illustrations show two bolts, namely, a first bolt 103 attaching the first clamp member 102 to the first saddle 101, and second bolt 203 attaching the second clamp member 202 to the second saddle 201, respectively). The first clamp member 102 and second clamp member 202 are attached to the body 100 by means known in the art, such as bolts 104, 204 (the illustrations show two bolts, namely, a third bolt 104 attaching the first clamp member 102 to the body 100 adjacent the first saddle 101, and a fourth bolt 204 attaching the second clamp member 202 to the body 100 adjacent the second saddle 201, respectively). The body 100 has a capture pin hole 105 that can be used in conjunction with a capture pin 109 (see FIG. 1B) wherein the portion of capture pin 109 (shown sectioned) that extends into the pocket 107 serves to secure the truss pick to a link of chain 106.

FIG. 1B is a section view of the embodiment of the truss pick in FIG. 1A. The body 100 also has a pocket 107 which is both deep and wide enough to hold link of chain 106 in the pocket 107 using a capture pin 109 through the capture pin hole 105 (see FIG. 1A). The pocket 107 is connected to a suspension hole 108 that goes through the bottom portion of the body 100.

FIG. 2A is a side view of an embodiment of a truss pick. FIG. 2B is a section view of the embodiment of the truss pick in FIG. 2A. This embodiment has three pockets 107 and three suspension holes 108. Non-looped tension member 200 is shown going through the center of pocket 107 and suspension hole 108. The non-looped tension member 200 is secured to truss pick by a nut 205.

FIG. 3A is a side view of an embodiment of the present invention. FIG. 3B is a sectioned view of the embodiment of the present invention shown in FIG. 3A. This embodiment shows two links of two chains 106, with each one of the two links of chains 106 separately being inserted into different pockets 107. Each of the different pockets 107 is intersected by a separate capture pin hole 105. As can be seen in FIG. 3B, each of the two links of chain 106 is separately captured, respectively, by a different one of two capture pins 109.

Various embodiments having been thus described in detail and by way of example, it will be apparent to those of skilled in the art that variations and modifications may be made and still achieve the desired outcome. The embodiments described herein include all such variations and modifications as fall within the scope of the claims.

What is claimed is:
1. A truss pick comprising:
(A) a body having a top portion and a bottom portion;
(B) a first saddle and a second saddle, both integral with the body;
(C) a first clamp member and a second clamp member, with the first clamp member being attachable to the first saddle and to the body adjacent the first saddle, and the second clamp member being attachable to the second saddle and to the body adjacent the second saddle;
(D) a pocket formed in the top portion of the body, wherein the pocket extends toward, but does not extend through, the bottom portion of the body, and with the pocket further comprising an inside wall;
(E) a capture pin hole extending into the body and intersecting the inside wall of the pocket; and
(F) a suspension hole substantially perpendicular to the capture pin hole and extending from a bottom surface of the pocket through the bottom portion of the body; wherein the truss pick is configured to attach to a looped end of a looped tension member selected from the following group: a chain link of a chain, a looped end of a looped cable, or a looped end of a swage eye cable termination, the pocket configured to receive the looped end of the looped tension member; and the truss pick is also configured to attach, alternatively, to a non-looped tension member selected from the following group: a cable or a rod, the suspension hole configured to receive the non-looped tension member.

2. The truss pick of claim 1 further comprising a capture pin for restraining the looped end of the looped tension member in the pocket of the truss pick, the capture pin being insertable into the capture pin hole, and the capture pin extending into the pocket when inserted into the capture pin hole.

3. The truss pick of claim 2, wherein:
(A) the first clamp member is removably attachable to the first saddle and to the body adjacent the first saddle; and
(B) the second clamp member is removably attachable to the second saddle and to the body adjacent the second saddle.

4. The truss pick of claim 2, wherein:
(A) the first clamp member is removably attachable to the first saddle using a first bolt, and the first clamp member is removably attachable to the body adjacent the first saddle using a third bolt; and
(B) the second clamp member is removably attachable to the second saddle using a second bolt, and the second clamp member is removably attachable to the body adjacent the second saddle using a fourth bolt.

5. The truss pick of claim 1, wherein:
(A) the first clamp member is removably attachable to the first saddle and to the body adjacent the first saddle; and
(B) the second clamp member is removably attachable to the second saddle and to the body adjacent the second saddle.

6. The truss pick of claim 1, wherein:
(A) the first clamp member is removably attachable to the first saddle using a first bolt, and the first clamp member is removably attachable to the body adjacent the first saddle using a third bolt; and
(B) the second clamp member is removably attachable to the second saddle using a second bolt, and the second clamp member is removably attachable to the body adjacent the second saddle using a fourth bolt.

7. A truss pick comprising:
(A) a body having a top portion and a bottom portion;
(B) a first saddle and a second saddle, both integral with the body;
(C) a first clamp member and a second clamp member, with the first clamp member being attachable to the first saddle and to the body adjacent the first saddle, and the second clamp member being attachable to the second saddle and to the body adjacent the second saddle;
(D) a pocket formed in the top portion of the body, wherein the pocket extends toward, but does not extend through, the bottom portion of the body, and with the pocket further comprising an inside wall;
(E) a capture pin hole extending into the body and intersecting the inside wall of the pocket; and
(F) a suspension hole substantially perpendicular to the capture pin hole and extending from a bottom surface of the pocket through the bottom portion of the body;
wherein the truss pick is configured to attach to a looped end of a looped tension member, the pocket configured to receive the looped end of the looped tension member; and the truss pick is also configured to attach, alternatively, to a non-looped tension member, the suspension hole configured to receive the non-looped tension member.

8. The truss pick of claim 7, wherein
the looped end of the looped tension member is selected from the following group: a chain link of a chain, a looped end of a looped cable, or a looped end of a swage eye cable termination.

9. The truss pick of claim 8, wherein:
(A) the first clamp member is removably attachable to the first saddle, and to the body adjacent the first saddle; and
(B) the second clamp member is removably attachable to the second saddle, and to the body adjacent the second saddle.

10. The truss pick of claim 9 further comprising:
a capture pin for restraining the looped end of the looped tension member in the pocket, the capture pin being insertable into the capture pin hole, wherein the capture pin extends into the pocket when the capture pin is inserted into the capture pin hole.

11. The truss pick of claim 8 further comprising:
a capture pin for restraining the looped end of the looped tension member in the pocket, the capture pin being insertable into the capture pin hole, wherein the capture pin extends into the pocket when the capture pin is inserted into the capture pin hole.

12. The truss pick of claim 8, wherein:
(A) the first clamp member is removably attachable to the first saddle using a first bolt, and the first clamp member is removably attachable to the body adjacent the first saddle using a third bolt; and
(B) the second clamp member is removably attachable to the second saddle using a second bolt, and the second clamp member is removably attachable to the body adjacent the second saddle using a fourth bolt.

13. The truss pick of claim 12 further comprising:
a capture pin for restraining the looped end of the looped tension member in the pocket, the capture pin being insertable into the capture pin hole, wherein the capture pin extends into the pocket when the capture pin is inserted into the capture pin hole.

14. The truss pick of claim 7 wherein the non-looped tension member is selected from the following group of non-looped tension members: a cable or a rod.

15. The truss pick of claim 7 further comprising:
a capture pin for restraining the looped end of the looped tension member in the pocket, the capture pin being insertable into the capture pin hole, wherein the capture pin extends into the pocket when the capture pin is inserted into the capture pin hole.

* * * * *